(12) United States Patent
Bakk

(10) Patent No.: US 11,134,551 B2
(45) Date of Patent: Sep. 28, 2021

(54) FLICKER REDUCTION IN LED LIGHT SOURCES

(71) Applicant: TRIDONIC GMBH & CO KG, Dornbirn (AT)

(72) Inventor: Istvan Bakk, Torokbalint (HU)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/633,189

(22) PCT Filed: Jul. 23, 2018

(86) PCT No.: PCT/EP2018/069914
§ 371 (c)(1),
(2) Date: Jan. 23, 2020

(87) PCT Pub. No.: WO2019/020565
PCT Pub. Date: Jan. 31, 2019

(65) Prior Publication Data
US 2021/0153323 A1    May 20, 2021

(30) Foreign Application Priority Data

Jul. 24, 2017 (GB) ...................................... 1712146

(51) Int. Cl.
*H05B 39/04* (2006.01)
*H05B 41/36* (2006.01)
(Continued)

(52) U.S. Cl.
CPC ......... *H05B 45/3725* (2020.01); *H05B 45/10* (2020.01); *H05B 45/48* (2020.01); *H05B 45/395* (2020.01)

(58) Field of Classification Search
CPC ...... H05B 45/48; H05B 45/10; H05B 45/395; H05B 45/3725
See application file for complete search history.

(56) References Cited

U.S. PATENT DOCUMENTS

2010/0045210 A1\* 2/2010 Hariharan .......... H05B 45/3725
315/297
2010/0308738 A1   12/2010 Shteynberg et al.
(Continued)

FOREIGN PATENT DOCUMENTS

DE    20 2016 100 573    5/2017

OTHER PUBLICATIONS

Great Britain search report dated Jan. 16, 2018 in priority application GB1712146.8.
(Continued)

*Primary Examiner* — Minh D A
(74) *Attorney, Agent, or Firm* — Andrus Intellectual Property Law, LLP

(57) ABSTRACT

LED light source, comprising a series connection of at least two LED strings, wherein each of the at least two LED strings corresponds to a single LED or comprises at least two LEDs, wherein at least one ohmic resistive element is connected in series with a first LED string of the at least two LED strings, and at least one switching element is connected in parallel to the series connection of the at least one ohmic resistive element and the first LED string, wherein the at least one switching element is configured to bypass in its conductive state the series connection of the at least one ohmic resistive element and the first LED string.

21 Claims, 5 Drawing Sheets

(51) Int. Cl.
*H05B 45/3725* (2020.01)
*H05B 45/10* (2020.01)
*H05B 45/48* (2020.01)
*H05B 45/395* (2020.01)

(56) References Cited

U.S. PATENT DOCUMENTS

| | | |
|---|---|---|
| 2010/0308739 A1 | 12/2010 | Shteynberg et al. |
| 2012/0081009 A1 | 4/2012 | Shteynberg et al. |
| 2013/0069547 A1 | 3/2013 | van de Ven et al. |
| 2013/0162153 A1 | 6/2013 | van de Ven et al. |
| 2014/0028203 A1 | 1/2014 | Pan et al. |
| 2014/0191676 A1 | 7/2014 | Seider et al. |
| 2015/0108909 A1* | 4/2015 | Rupp ............... H05B 45/345 315/188 |
| 2016/0100464 A1* | 4/2016 | Shackle ............ H05B 45/395 315/122 |
| 2017/0223784 A1* | 8/2017 | Mercier ............ H05B 45/48 |

OTHER PUBLICATIONS

International Search Report and Written Opinion dated Oct. 12, 2018 in parent PCT application PCT/EP2018/069914.

\* cited by examiner

FLICKER REDUCTION IN LED LIGHT SOURCES

CROSS REFERENCE TO RELATED APPLICATIONS

The present application is the U.S. national stage application of international application PCT/EP2018/069914 filed Jul. 23, 2018, which international application was published on Jan. 31, 2019 as International Publication WO 2019/020565 A1. The international application claims priority to Great Britain Patent Application 1712146.8 filed Jul. 24, 2017.

FIELD OF THE INVENTION

The present invention relates to two different types of LED light sources, in particular to a direct AC LED light source and a LED light source with at least one actively switched LED driver stage, and to a LED lamp comprising at least one of such LED light sources.

BACKGROUND OF THE INVENTION

In the prior art, the use of LEDs for lighting and different operation means for operating LEDs are well known.

LED light sources, which may be directly connected to mains voltage (AC voltage) without the use of any additional drivers, converters or ballasts for a power factor correction (PFC), are known as "direct AC LED light sources".

Such direct AC LED light source usually comprises a series connection of LEDs, wherein during operation of the direct AC LED light source the LEDs are controlled to be bypassed, such that the current flowing through the series connection of LEDs is matched to the rectified AC voltage used as supply voltage for the direct AC LED light source.

Furthermore, LED light sources with at least one actively switched LED driver stage for driving the LEDs of the LED light source are known. The actively switched LED driver stage usually comprises at least a switching element and an energy storage element, in particular an inductor. By switching respectively clocking the switching element and, thus, charging and discharging the energy storage element a voltage respectively current for driving the LEDs may be controlled. In addition, a PFC function may be achieved by switching the switching element dependent on the AC voltage provided as supply voltage to the LED light source, in particular to the actively switched LED driver stage.

In both types of LED light sources, i.e. in direct AC LED light sources and LED light sources with an actively switched LED driver stage, a flicker may occur in the light emitted by the LEDs as a result of fluctuations in the mains voltage (AC voltage) used as supply voltage for driving the LEDs.

Capacitors may be connected in parallel to the LEDs in order to reduce such flicker.

However, for reducing such flicker from 100% to low rates of 4 to 20%, very large and typically high voltage capacitors have to be used, which increases the costs and dimensions of the LED light source.

Therefore, it is an object of the present invention to provide a LED light source which is configured to reduce the above mentioned flicker in the light emitted from the LEDs of the LED light source without having the above mentioned disadvantages. It is in particular an object of the present invention to overcome the above described problems in a direct AC LED light source as well as in a LED light source with a LED driver stage.

These and other objects, which become apparent upon reading the following description, are solved by the subject-matter of the independent claim. The dependent claims refer to preferred embodiments of the invention.

SUMMARY OF THE INVENTION

According to the invention a LED light source is provided, which comprises a series connection of at least two LED strings: Each of the at least two LED strings corresponds to a single LED or comprises at least two LEDs, at least one ohmic resistive element, and at least one switching element. The at least one ohmic resistive element is connected in series with a first LED string of the at least two LED strings, and the at least one switching element is connected in parallel to the series connection of the at least one ohmic resistive element and the first LED string, The at least one switching element is configured to bypass in its conductive state the series connection of the at least one ohmic resistive element and the first LED string.

In other words, the present invention proposes a direct AC LED light source with at least two LED strings connected in series to each other. To a first LED string of the at least two LED strings a switching element is connected in parallel, which is configured to bypass the LED string. In addition, an ohmic resistive element is connected in series to the first LED string and, thus, the switching element is connected in parallel to the series connection of the first LED string and the ohmic resistive element.

As a result of the ohmic resistive element connected in series to the first LED string, the resulting differential resistance of the series connection of the first LED string and the ohmic resistive element is increased by the value of the ohmic resistive element. That is, as a result of the ohmic resistive element connected in series to the first LED string, the differential resistance of the resulting LED string formed by the first LED string and the ohmic resistive element is increased by the value of the ohmic resistive element. This is advantageous, as with increasing differential resistance of the LED string, the LED string gets less sensible to fluctuations in the rectified AC voltage supplied to the series connection of the LED strings as supply voltage.

In the context of the present invention the term "sensibility of a LED string" has to be understood as the degree of flickering occurring in the light emitted by the LED string as a result of fluctuations in the AC supply voltage. That is, the more sensible the LED string is with regard to fluctuations in the AC supply voltage, the higher is the degree of flickering occurring in the light emitted by the LED string as a result of the fluctuations in the AC supply voltage.

In order to match the rectified AC voltage, which may be supplied to the series connection of the at least two LED strings during the operation of the LED light source, the at least one switching element is preferably controlled dependent on the rectified AC voltage in order to bypass the first LED string dependent on the rectified AC voltage. For example, with respect to a half wave of the rectified AC voltage, at low values of the rectified AC voltage the switching element is preferably controlled to be in the conductive state bypassing the first LED string and, thus, the current flowing through the series connection of LED strings flows only through the second LED string of the at least two LED strings of the LED light source. When the value of the rectified AC voltage rises above a predetermined voltage level, the switching element is preferably controlled to switch to the non-conductive state, which ends the bypassing of the first LED string. Thus, for values of the rectified AC voltage above the predetermined voltage level, the current flowing through the series connection of the LED strings of the LED light source flows through the first and second LED string. The switching element preferably stays in the non-conductive state until the value of the rectified AC voltage falls again below the predetermined voltage level. Thus, when the value of the rectified AC voltage falls again below the predetermined voltage level, the switching element is switched to the conductive state again.

The LED light source comprises a series connection of at least two LED strings. That is, the LED light source comprises two or more LED strings which are connected in series to each other. Preferably, any LED string of the series connection of LED strings may have an ohmic resistive element connect in series to it and in addition or alternatively a switching element connected in parallel to it. In case a LED string has an ohmic resistive element connected in series to it and in addition a switching element connected in parallel to it, the switching element is connected in parallel to the series connection of the LED string and the ohmic resistive element.

Each LED string may correspond to a single LED (light emitting diode) or may comprise at least two LEDs, i.e. two or more LEDs.

In case a LED string comprises at least two LEDs, the LEDs may be connected to each other in series and/or in parallel.

Preferably, each LED of the LED light source is part of a respective LED string and, thus, of the series connection of LED strings of the LED light source. The LEDs of the series connection of the LED strings preferably form the light emitting part of the LED light source. The LED light source may also comprise at least one LED, which is not part of the series connection of the LED strings, such as e.g. a control LED indicating whether an AC voltage is supplied to the LED light source or not.

The LEDs of the LED light source may be of any known type, such as e.g. inorganic or organic LEDs.

Preferably, the LED light source comprises a controller configured to control the at least one switching element, such that the waveform of the rectified AC supply voltage is matched during operation of the LED light source, in particular of the LEDs of the at least two LED strings. The controller is preferably an ASIC (application-specific integrated circuit), microcontroller or a hybrid thereof.

Therefore, in case the LED light source comprises a plurality of switching elements for bypassing a plurality of LEDs strings, the controller is configured to control all the switching elements, such that the current flowing through the series connection of LED strings is matched to the waveform of the rectified AC supply voltage during operation of the LED light source.

The at least one switching element, i.e. the one or more switching elements, of the LED light source may alternatively be controlled by a external controller, for example by a central controller configured to control a plurality of LED light sources according to the present invention.

The at least one switching element is preferably a transistor, such as a field effect transistor or a bipolar transistor.

Preferably, the LED light source according to the invention is an integrated LED light source, in particular an integrated direct AC LED light source.

Preferably, the LED light source comprises at least two capacitors, wherein a first capacitor of the at least two capacitors is connected in parallel to the series connection of the at least one ohmic resistive element and the first LED string and the second capacitor of the at least two capacitors is connected in parallel to the second LED string of the at least two LED strings.

Preferably, a capacitor is connected in parallel to each LED string of the LED light source, wherein in case an ohmic resistive element is connected in series to a LED string, the respective capacitor is connected in parallel to the series connection of the LED string and the ohmic resistive element.

Preferably, the LED light source comprises at least one decoupling element, preferably at least one diode, which is connected between the at least one switching element and the respective parallel connection of the first capacitor and the series connection of the at least one ohmic resistive element and the first LED string, such that in the conductive state of the at least one switching element the first capacitor is not discharged via the at least one switching element and is configured to provide electrical energy to the first LED string.

Preferably, on the side of higher potential, when the rectified AC voltage is applied to the series connection of the LED strings, the switching element, connected in parallel to the first LED string and the capacitor, is decoupled by a decoupling element, preferably a diode, from the first LED string and the capacitor. As a result, when the switching element bypasses in the conductive state the current flow, the capacitor is not discharged via the switching element.

Preferably, for each parallel connection of a switching element to a parallel connection of a LED string and a capacitor in the LED light source, a decoupling element, preferably a diode, is connected between the switching element and the respective parallel connection of the LED string and the capacitor in order to decouple the switching element from the respective parallel connection of the LED string and the capacitor.

Preferably, the decoupling element is arranged on the side with the higher potential of the switching element and the respective parallel connection of the LED string and the capacitor, when an AC voltage is applied to the series connection of LED strings of the LED light source.

Preferably, a diode is provided as decoupling element for the above described electrical decoupling. Any other element known to the skilled person and configured to provide the decoupling characteristic of a diode may also be used as decoupling element.

In a first preferred alternative, the at least one ohmic resistive element is preferably a static ohmic resistive element, more preferably an ohmic resistor.

In a second preferred alternative, the at least one ohmic resistive element is preferably a dynamic ohmic resistive element, preferably a linear current regulator or a variable current regulator.

That is, the ohmic resistance of a linear or variable current regulator may be used as an ohmic resistive element, wherein the ohmic resistive value of the ohmic resistive element may be controlled respectively changed by the operation of the linear or variable current regulator.

Preferably, the dynamic ohmic resistive element is preferably configured to decrease its ohmic resistive value as the voltage across the respective capacitor decreases and vice versa.

Preferably, the at least one switching element is configured to limit the voltage across the series connection of the first LED string and the at least one resistive element to a predetermined voltage value.

This prevents a runaway situation when the ohmic resistive value of a dynamic ohmic resistive element is increased as a result of the voltage across the respective capacitor increasing.

Further, the at least one ohmic resistive element is preferably configured to increase the differential resistance of the series connection of the first LED string and the at least one ohmic resistive element, such that a flicker of the first LED string caused by the supply voltage during operation of the LED light source is less than 8%, preferably less than 6%, more preferred less than 4%.

In other words, in the LED light source the ohmic resistive value of an ohmic resistive element is preferably chosen or controlled, such that the resulting differential resistance of the series connection of the ohmic resistive element and the respective LED string is set to an ohmic resistive value, that limits the flicker of the respective LED string to less than 8%, preferably less than 6% and more preferred less than 4%.

In the present invention "flicker of a LED string" has to be understood as the flicker occurring in the light emitted by the LED string as a result of fluctuations in the AC voltage supplied to the LED string.

Furthermore, in the present invention "a flicker of 1%" has to be understood as a fluctuation respectively variation of 1% in the light emitted by a LED string of the LED light source with respect to the light level set by the operation of the LED light source. That is, a flicker of 1% is a variation by 1% from the light level emitted by the LED light source without any fluctuations in the AC supply voltage.

Furthermore, the at least one ohmic resistive element preferably has an ohmic resistive value between 50 Ohm and 800 Ohm, more preferably 100 Ohm and 300 Ohm.

That is, in case the ohmic resistive element is a static ohmic resistive element, the ohmic resistive value of the ohmic resistive element is preferably between 50 and 800 Ohm, more preferably between 100 and 300 Ohm. In case the ohmic resistive element is a dynamic ohmic resistive element, the dynamic ohmic resistive element is preferably configured to provide an ohmic resistive value between 50 and 800 Ohm, more preferably between 100 and 300 Ohm.

Moreover, the ohmic resistive value of the at least one ohmic resistive element is preferably chosen dependent on the differential resistance of the respective LED string, such that the higher the differential resistance of the LED string the lower the ohmic resistive value of the at least one ohmic resistive element.

Preferably, the at least two LED strings comprise a different number of LEDs.

The LED strings of the LED light source may also comprise the same number of LEDs.

Preferably, an ohmic resistive element is connected in series to each of the at least two LED strings, and the ohmic resistive value of the ohmic resistive element connected to one of the at least two LED strings differs from the ohmic resistive value of the ohmic resistive element connected to the other one of the at least two LED strings.

That is, in case the at least two LED strings each comprise a different number of LEDs and each have an ohmic resistive element connected in series to it, the respective ohmic resistive elements have a different ohmic resistive value.

Further, an ohmic resistive element is preferably connected in series to each LED string that comprises more than a predetermined number of LEDs.

Preferably, the predetermined number of LEDs corresponds to 20%, preferably 25%, more preferably to 30% of all LEDs of the series connection of LED strings of the LED light source.

Furthermore, each of the at least two LED strings is preferably connected in parallel to a switching element, which switching element is configured to bypass the respective LED string.

That is, each of the LED strings of the LED light source preferably has a switching element connected in parallel to it and, thus, may be bypassed by the switching element.

Preferably, in case an ohmic resistive element is connected in series to a LED string which is configured to be bypassed by a switching element, the respective switching element is connected in parallel to the series connection of the LED string and the ohmic resistive element.

Preferably, the LED light source comprises at least two switching elements, wherein a first switching element of the at least two switching elements is connected in parallel to the series connection of the at least one ohmic resistive element and the first LED string, wherein the second switching element of the at least two switching elements is connected in parallel to the second LED string, and wherein each of the two switching elements is configured to bypass in its conductive state the respective LED string of the at least two LED strings.

Preferably, the LED light source comprises at least two switching elements and at least two ohmic resistive elements, wherein one ohmic resistive element is connected in series to each of the at least two LED strings, wherein one switching element is connected in parallel to each of the series connections of one ohmic resistive element and the respective LED string, wherein each of the at least two switching elements is configured to bypass in its conductive state the respective series connection of one ohmic resistive element and the respective LED string.

Further, the at least two LED strings preferably comprise a different number of LEDs, such that in the series connection of the at least two LED strings each LED string has twice as much LEDs as the previous LED string.

That is, the number of LEDs of the LED strings is preferably chosen, such that each LED string has twice respectively double as much LEDs as the previous LED string in the series connection of LED strings. Preferably, the LED string nearest to the node of the series connection of LED strings for receiving the high potential of the supply voltage has the maximum number of LEDs, the previous LED string in the series connection of LED strings has half the LEDs in comparison to the maximum number of LEDs, the thereupon previous LED string has a quarter of the LEDs in comparison to the maximum number of LEDs and so on.

Preferably, the LED light source comprises at least four LED strings, wherein the first LED string of the at least four LED strings, being connected to the node of the series connection of LED strings for receiving the high potential of the supply voltage, comprises eight LEDs; wherein the second LED string of the at least four LED strings, being arranged nearest to the first LED string in the series connection of LED strings, comprises four LEDs; wherein the third LED string of the at least four LED strings, being arranged second nearest to the first LED string in the series connection of LED strings, comprises two LEDs; and wherein the fourth LED string of the at least four LED strings, being arranged most far away from the first LED string in the series connection of LED strings, corresponds to a single LED.

In addition, the LED light source preferably comprises two ohmic resistive elements, wherein one ohmic resistive element is connected in series to each of the first and second LED string.

That is, in the above described embodiment of a LED light source having at least four LED strings, the LED string with eight LEDs and the LED string with four LEDs each have preferably an ohmic resistive element connected in series to it.

The above features may be combined in any way to form the LED light source according to the invention.

According to the invention a further LED light source is provided comprising a LED string corresponding to a single LED or comprising at least two LEDs, an ohmic resistive element, which is connected in series to the LED string, and at least one actively switched LED driver stage, wherein the output of the at least one actively switched LED driver stage is connected in parallel to the series connection of the LED string and the ohmic resistive element.

In other words, the present invention also proposes a LED light source with at least one actively switched LED driver stage.

As a result of a resistive ohmic element connected in series to the LED string, the differential resistance of the resulting LED string formed by the series connection of the LED string and the ohmic resistive element is increased. By increasing the differential resistance the sensibility of the LED string to fluctuations in the AC supply voltage is decreased respectively reduced and, thus, the degree of flicker occurring in the light emitted from the LED string as a result of fluctuations in the AC supply voltage is also reduced.

The above description of elements of the direct AC LED light source according to the invention is also valid for corresponding elements of the further LED light source with at least one actively switched LED driver stage according to the invention.

The actively switched LED driver stage preferably comprises at least one switching element and an electrical energy storage element, such as an inductor. By switching respectively clocking the switching element and, thus, charging and discharging the energy storage element a voltage respectively current provided at the output of the actively switched LED driver stage may be controlled.

Preferably the LED light source comprises a controller, such as an ASIC, microcontroller or hybrid thereof, configured to control the switching of the at least one switching element. The at least one switching element may alternatively be controlled by an external controller, such as a central controller for controlling a plurality of LED light sources.

Preferably, the actively switched LED driver stage comprises a secondary switched DC-to-DC-converter, such as e.g. a buck converter or a boost converter, or a primary switched DC-to-DC-converter, such as e.g. a flyback converter. A secondary switched DC-to-DC-converter does not comprise a galvanic isolation between the input and output, whereas the primary switched DC-to-DC-converter comprises a galvanic isolation between the input and output. The actively switched LED driver stage may comprise a PFC functionality.

Preferably, the at least one actively switched LED driver stage comprises a capacitor at its output, which capacitor is connected in parallel to the series connection of the LED string and the ohmic resistive element.

Thus, the voltage provided by the actively switched LED driver stage is stored in the capacitor at its output, which preferably smoothens the voltage ripple.

Preferably, the LED light source with the at least one actively switched LED driver stage is an integrated LED light source.

Furthermore, according to the invention a LED lamp is provided that comprises at least one LED light source according to the above description.

BRIEF DESCRIPTION OF THE DRAWINGS

In the following, the invention is described exemplarily with reference to the enclosed figures, in which

In the figures of the present invention corresponding elements are labeled with the same reference sign.

FIG. 1 is a schematic circuit diagram of a first embodiment of a LED light source according to the invention. The LED light source 1 according to FIG. 1 is a direct AC LED light source with a series connection of two LED strings 2a and 2b. As mentioned already above, the LED light source according to the present invention may also have more than two LED strings.

The two LED strings 2a and 2b are connected in series between the supply nodes N1 and N2 of the LED light source 1, to which a rectified AC voltage may be supplied. The node N1 corresponds to the node of the series connection of LED strings for receiving the higher potential of the rectified AC supply voltage and the node N2 corresponds to the node for receiving the lower potential of the rectified AC supply voltage. Thus, the rectified AC voltage is directly supplied via the nodes N1 and N2 to the series connection of LED strings 2a and 2b. That is, no LED driver stage is arranged between the voltage supply and the series connection of LED strings 2a and 2b.

Figure 1:
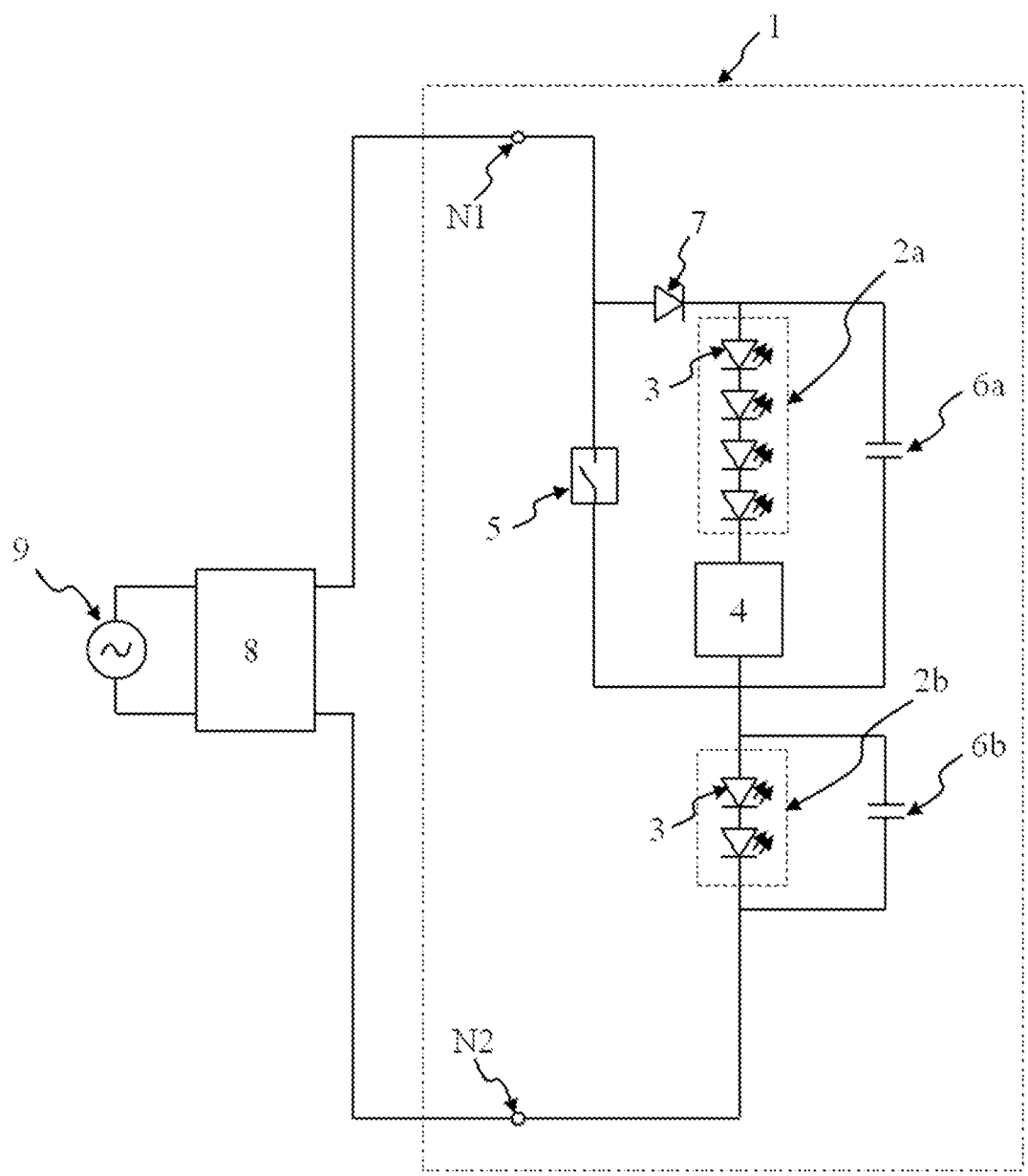
FIG. 1 is a schematic circuit diagram of a first embodiment of a LED light source according to the invention.

According to FIG. 1, a diode 7 is connected between the node N1 of the series connection of LED strings 2a and 2b and the first LED string 2a. This diode 7 is provided as decoupling element for decoupling the switching element 5 from the first LED string 2a, the ohmic resistive element 4 and the capacitor 6. As a result, the capacitor is not discharged via the switching element 5, when the switching element 5 is in the conductive state.

For supplying a rectified AC voltage to the LED light source 1, an AC voltage supply 9, such as mains, provides an AC voltage to a rectifier 8, which rectifies the AC voltage and supplies the rectified AC voltage to the nodes N1 and N2 of the series connection of LED strings 2a and 2b of the LED light source 1.

According to FIG. 1, the AC voltage supply 9 and the rectifier 8 are not part of the LED light source 1. The rectifier 8 may be part of the LED light source 1 (not shown in FIG. 1).

The supply of a rectified AC voltage according to FIG. 1 is only one possible example for supplying a rectified AC voltage to the LED strings 2a and 2b of the LED light source 1. Any other means for supplying a rectified AC voltage may be implemented according to the invention. For example, the rectified AC voltage may alternatively be supplied by a power supply bus.

The first LED string 2a of the LED light source 1 preferably comprises four LEDs 3 and is connected on one side via the diode 7 to the node N1 of the LED light source 1 for receiving the high potential of the AC supply voltage. On the other side the first LED string 2a is connected in series to an ohmic resistive element 4.

The ohmic resistive element 4 may be implemented, as already outlined above. That is, according to a first alternative the ohmic resistive element 4 may be a static ohmic resistive element, such as an ohmic resistor, and according to a second alternative the ohmic resistive element 4 may be a dynamic ohmic resistive element, such as a linear or variable current regulator.

As a result of the ohmic resistive element 4, the differential resistance of the resulting first LED string formed by the first LED string 2a and the ohmic resistive element 4 is increased by the ohmic resistive value of the ohmic resistive element 4 in comparison to the differential resistance of the first LED string 2a alone. The sensibility of the first LED string 2a with regard to fluctuations in the AC supply voltage is decreased as the differential resistance is increased by the ohmic resistive element 4 connected in series to the first LED string 2a.

The series connection of the first LED string 2a and the ohmic resistive element 4 is connected in parallel to a capacitor 6a. The series connection of the first LED string 2a and the ohmic resistive element 4 is further connected in parallel to a switching element 5, wherein on the side of the node N1 for receiving the higher potential of the rectified AC voltage the switching element 5 is decoupled by a diode 7 from the parallel connection of the capacitor 6a and the series connection of the first LED string 2a and the ohmic resistive element 4.

In detail, the anode of the diode 7 is connected to the switching element 5 and the node N1 of the LED light source 1 and the cathode of the diode 7 is connected to the LED string 2a and the capacitor 6a. Thus, the LED string 2a and the capacitor 6 are decoupled from the switching element 5 via the diode 7.

As mentioned already above, any other decoupling element may be used instead of the diode.

Due to the increase of the differential resistance of the resulting first LED string by the ohmic resistive element 4, the discharge time of the capacitor 6a is increased, when the switching element 5 is in the conductive state and the LEDs 3 of the first LED string 2a are supplied with electrical energy from the capacitor 6a. That is, the higher the differential resistance of the resulting first LED string formed by the first LED string 2a and the ohmic resistance element 4, the lower the current drawn by the resulting first LED string from the capacitor 6a during the conductive state of the switching element and, thus, the slower the discharging of the capacitor 6a during the conductive state of the switching element 5.

In the non-conductive state of the switching element 5 the current flowing through the LED light source 1 flows via the first LED string 2a and the second LED string 2b, wherein the capacitors 6a and 6b are charged. In the conductive state of the switching element 5 the current flowing through the LED light source 1 flows via the switching element 5 and the second LED string 2b, wherein the capacitor 6a provides the electrical energy for the LEDs 3 of the first LED string 2a.

The switching element 5 is preferably switched respectively clocked as described above. That is, the switching element 5 is preferably switched, such that the current flowing through the LED light source 1 is matched to the half curve of the rectified AC voltage supplied by the rectifier 8 to the supply nodes N1 and N2 of the LED light source 1.

Preferably, the LED light source 1 comprises a controller (not shown in FIG. 1), such as an ASIC, microcontroller or a hybrid thereof, for controlling the switching of the switching element 5. The switching of the switching element 5 may also be controlled by an external controller.

The second LED string 2b preferably comprises two LEDs and is connected in series to the first LED string 2a. A capacitor 6b is connected in parallel to the second LED string 2b.

As mentioned already above, the LED light source according to the present invention may also comprise more than two LED strings and the number of LEDs of the LED strings may be different to the number of LEDs shown in FIG. 1.

Preferably, each LED string of the LED light source has an ohmic resistive element 4 connected in series to it. That is, preferably an ohmic resistive element 4 is also connected in series to the second LED string 2b of the LED light source 1 (not shown in FIG. 1).

In such a case, the ohmic resistive value of the ohmic resistive element 4 connected in series to the first LED string 2a preferably differs from the ohmic resistive value of the ohmic resistive element 4 connected in series to the second LED string 2b, as the number of LEDs of the first LED string 2a (four LEDs) differs from the number of LEDs of the second LED string 2b (two LEDs).

The number of LEDs 3 of the LED strings 2a and 2b are preferably chosen, such that the number of LEDs 3 of the first LED string 2a is double the number of LEDs 3 of the second LED string 2b. That is, according to FIG. 1, in the series connection of the two LED strings 2a and 2b the first LED string 2a has twice as much LEDs as the previous LED string, being the second LED string 2b.

Figure 2:
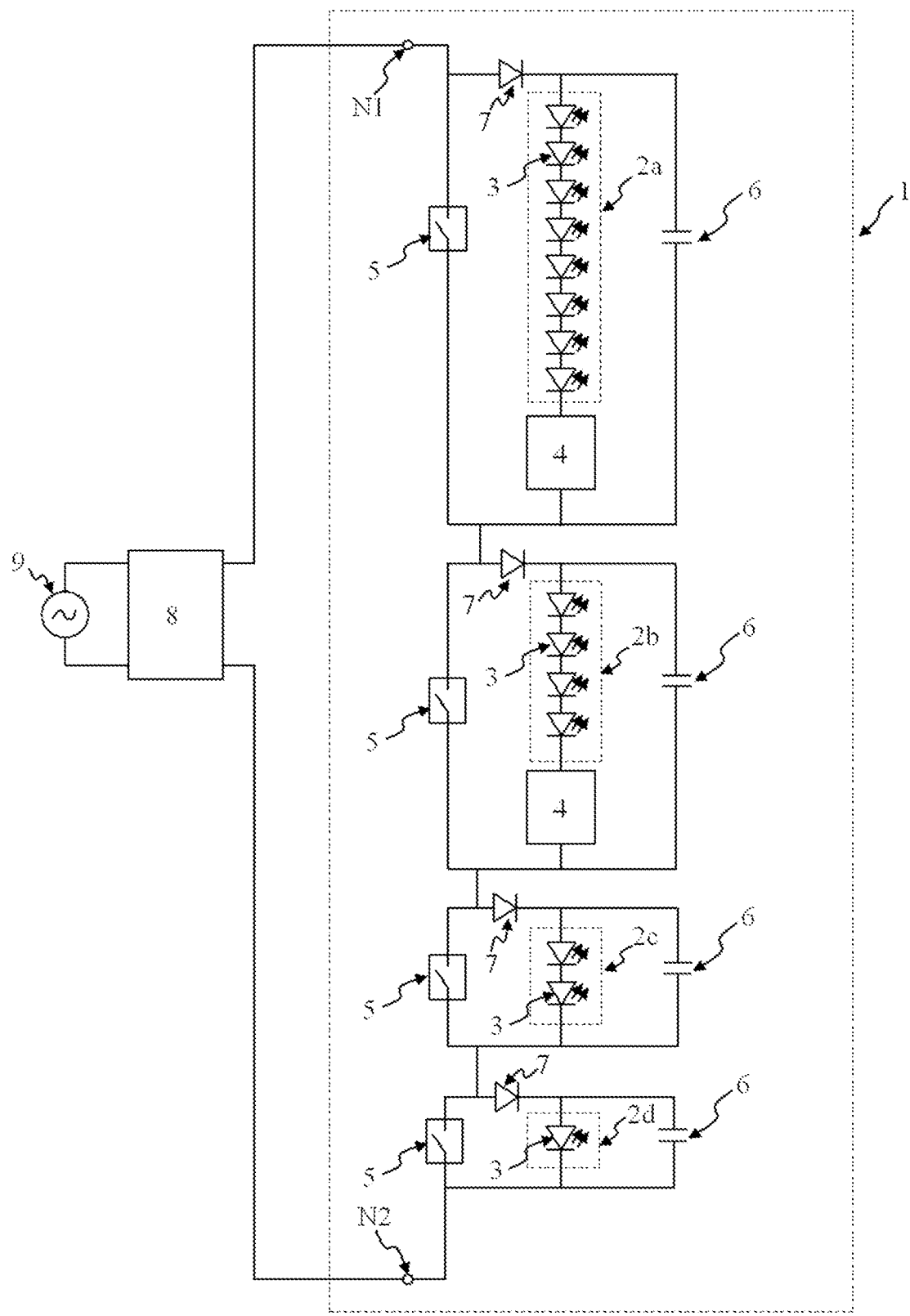
FIG. 2 is a schematic circuit diagram of a second embodiment of a LED light source according to the invention.

FIG. 2 is a schematic circuit diagram of a second embodiment of a LED light source according to the invention. The LED light source 1 of FIG. 2 is also a direct AC LED light source, as shown in FIG. 1. Thus, only the differences between the LED light source of FIG. 1 and the LED light source 1 of FIG. 2 are described in the following.

The LED light source 1 according to FIG. 2 comprise four LED strings 2a, 2b, 2c, 2d connected in series, wherein each LED string, except of the LED string 2d, comprises twice as much LEDs as the previous LED string in the series connection of LED strings. That is, the first LED string 2a comprises eight LEDs 3, the second LED string 2b comprises four LEDs 3, the third LED string 2c comprises two LEDs 3 and the fourth LED string 2d corresponds to a single LED 3.

Each of the LED strings 2a, 2b, 2c and 2d of the LED light source 1 according to FIG. 2 has a capacitor 6 connected in parallel to it. Furthermore, each of the LED strings 2a, 2b, 2c and 2d has a switching element 5 connected in parallel to it, which is decoupled by a diode 7 from the parallel connection of the respective LED string and respective capacitor 6.

Thus, each of the LED strings 2a, 2b, 2c and 2d may be bypassed by a respective switching element 5 in the conductive state, wherein in the conductive state of the respective switching element 5 the electrical energy is provided to the LEDs 3 by the respective capacitor 6.

Preferably, the switching of the four switching elements 5 and, thus, the bypassing of the four LED strings 2a, 2b, 2c and 2d is controlled by a controller, such that the current flowing through the LED light source 1, in particular through the series connection of the LED strings, is matched to the half curve of the rectified AC voltage supplied via the nodes N1 and N2 to the LED light source 1. The controller may be part of the LED light source 1 or external (not shown in FIG. 1).

The first LED string 2a and the second LED string 2b each have an ohmic resistive element 4 connected in series to it, in order to increase the resulting differential resistance. This decreases the sensibility of the LED string 2a and 2b. Preferably, the ohmic resistive value of the ohmic resistive element 4 connected in series to the first LED string 2a differs from the ohmic resistive value of the ohmic resistive element 4 connected in series to the second LED string 2b.

An ohmic resistive element 4 is connected to the first LED string 2a and second LED string 2b, as due to their larger number of LEDs 3 in comparison to the number of LEDs 3 of the third LED string 2c and fourth LED string 2d these two LED strings 2a and 2b have a high contribution to flicker occurring in the emitted light of the LED light source 1 as a result of fluctuations in the AC supply voltage.

Figure 3:
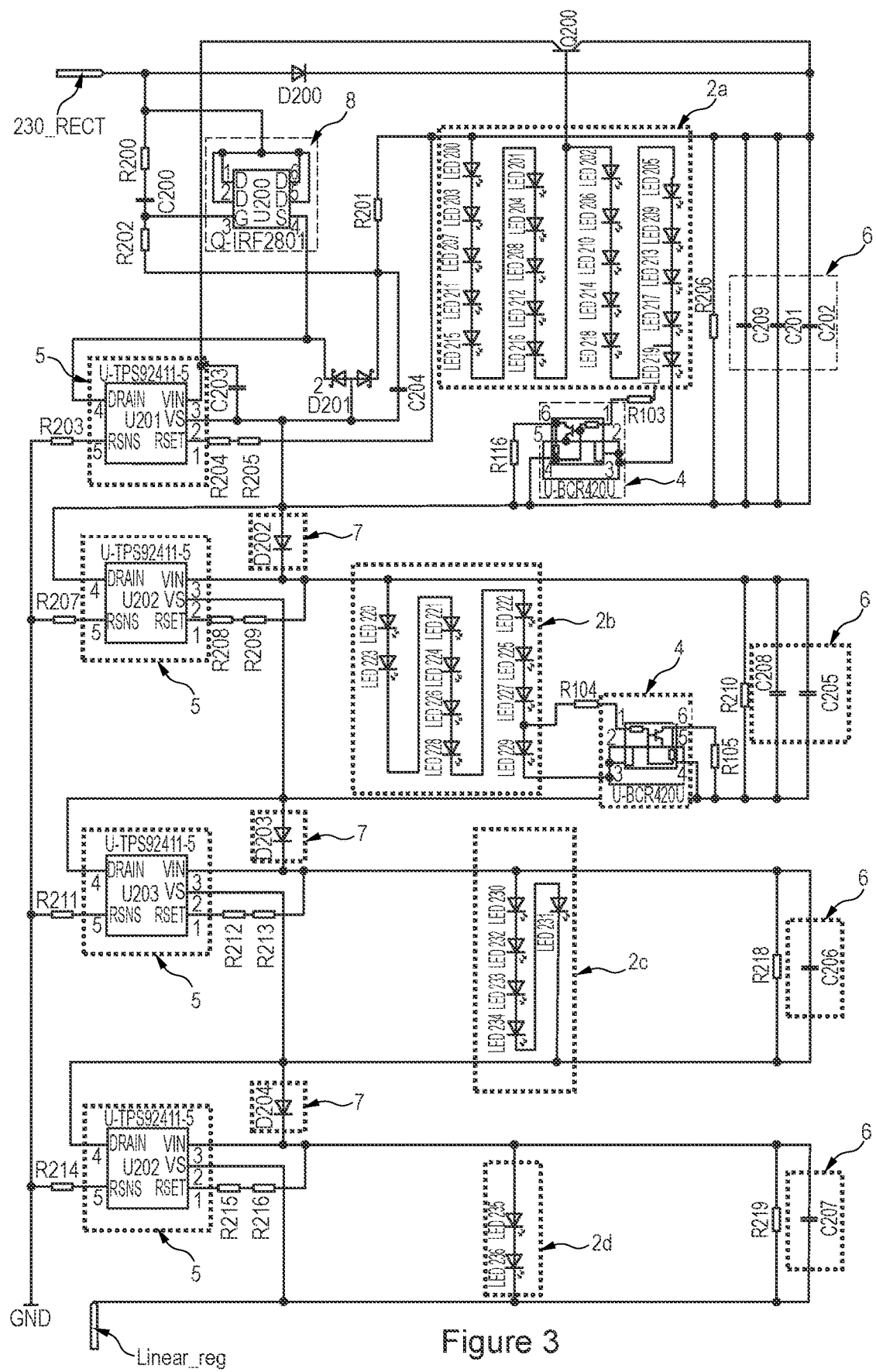
FIG. 3 is a schematic circuit diagram of an exemplarily implementation of the second embodiment of a LED light source according to the invention, as shown in FIG. 2.

FIG. 3 is a schematic circuit diagram of an exemplarily implementation of the second embodiment of a LED light source according to the invention, as shown in FIG. 2.

According to FIG. 3 the first LED string 2a comprises twenty LEDs, the second LED string 2b comprises ten LEDs, the third LED string 2c comprises four LEDs and the fourth LED string 2d comprises two LEDs.

To each of the first LED string 2a and second LED string 2b an ohmic resistive element 4 is connected in series. The ohmic resistive element 4 is provided in form of a current regulator circuit, such as the current regulator "BCR 420" from Infineon. Preferably, the current regulator circuit is distuned in order to provide an ohmic resistive element 4, wherein the ohmic resistive value is set by distuning the current regulator circuit.

For a further description of the ohmic resistive elements 4 of FIG. 3 the ohmic resistive element 4 connected in series to the first LED string 2a is described in the following by way of example.

The resistors R103 and R116 are provided for tuning the current regulator circuit 4 connected in series to the first LED string 2a, wherein the resistor R116 is relevant from a flicker reduction point of view as the regulating current may be set by the resistor R116.

The resistors R206, R210, R218 and R219 connected in parallel to the capacitors 6 are not relevant from a flicker reduction point of view. Their purpose is to reduce ghosting and bleed the capacitors 6 after turning the circuit off.

Preferably, the switching element 5 is implemented by a floating switch, such as e.g. the floating switch "TPS92411" of Texas Instruments.

Figure 4:
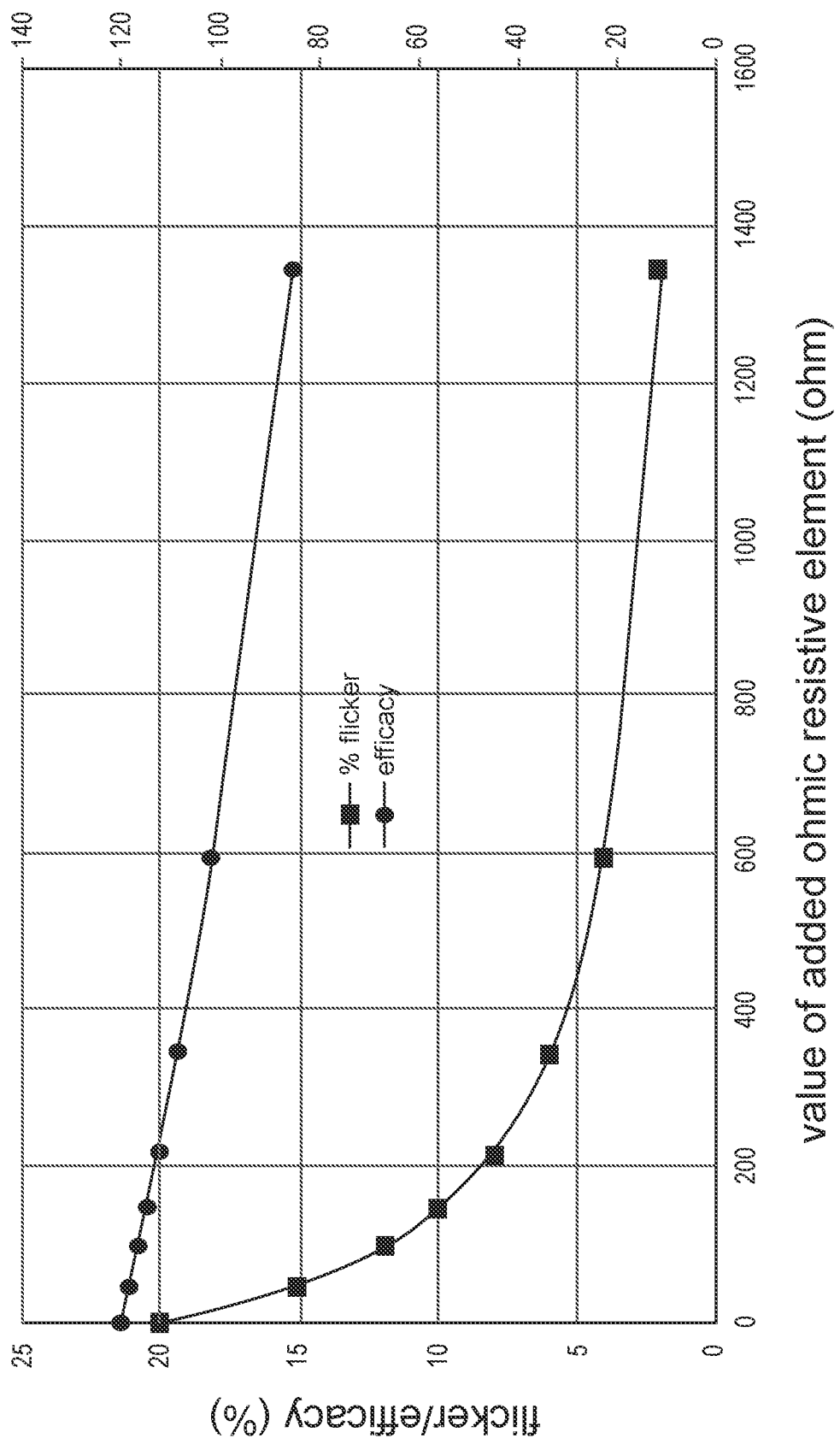
FIG. 4 exemplarily shows the relationship between the value of the ohmic resistive element and the flicker of the respective LED string of a LED light source according to the invention as well as the relationship between the value of the ohmic resistive element and the efficacy of the respective LED string.

FIG. 4 exemplarily shows the relationship between the value of the ohmic resistive element and the flicker of the respective LED string of a LED light source according to the invention as well as the relationship between the value of the ohmic resistive element and the efficacy of the respective LED string.

As shown in FIG. 4 by the line with the black squares, the flicker that occurs in the light emitted by a LED string of a LED light source according to the present invention as a result of fluctuations in the AC supply voltage reduces as the ohmic resistive value of the ohmic resistive element connected in series to the LED string increases. Namely, as a result of the increasing ohmic resistive value of the ohmic resistive element, the differential resistance of the resulting LED string formed by the series connection of the LED string and the ohmic resistive element increases. As the differential resistance increases the sensibility of the LED string to fluctuations in the AC supply voltage decreases and, thus, the degree of flicker (%) occurring in the light emitted by the LED string as a result of fluctuations in the AC supply voltage also decreases.

As can be seen in FIG. 4, not only the degree of flicker in the light emitted by a LED string of a LED light source of the present invention decreases with an increasing value of the ohmic resistive element connected in series to the LED string, but also the efficacy of the LED string decreases with the increasing value of the ohmic resistive element (cf. line with black dots in FIG. 4). Namely, due to the increased differential resistance of the resulting LED string formed by the series connection of the LED string and the ohmic resistive element, less electrical energy is converted by the LED string into light.

Therefore, in case the ohmic resistive element connected in series to a LED string is a dynamic ohmic resistive element, the ohmic resistive value of the dynamic ohmic resistive element is preferably decreased as the voltage across the capacitor connected in parallel to the series connection of the LED string and ohmic resistive element is decreased and vice versa.

Figure 5:
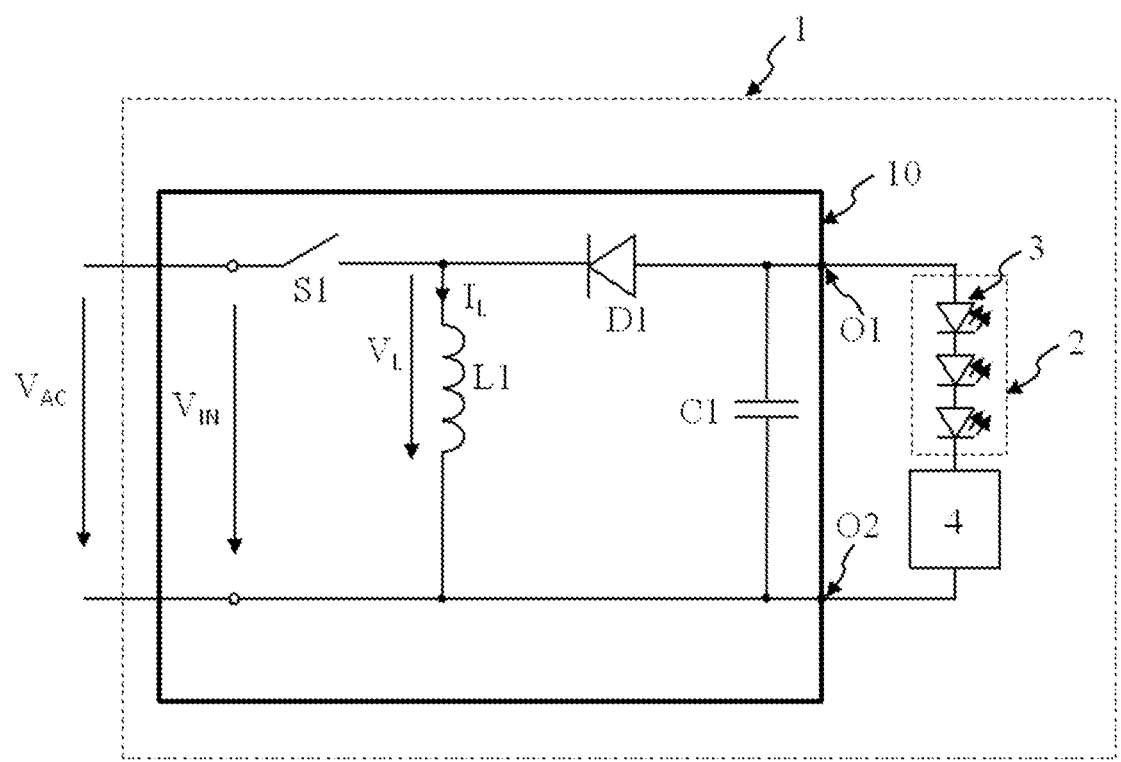
FIG. 5 is a schematic circuit diagram of a third embodiment of a LED light source according to the invention.

FIG. 5 is a schematic circuit diagram of a third embodiment of a LED light source according to the invention.

The LED light source 1 according to FIG. 5 correspond to a LED light source with an actively switched LED driver stage 10, as described above.

The actively switched LED driver stage 10 comprises a switching element S1 and an electrical storage element in form of an inductor L1. The switching element S1 may be a transistor, such as e.g. a field effect transistor or a bipolar transistor.

The voltage provided at the output O1, O2 of the LED driver stage 10 may be controlled by controlling the switching respectively clocking of the switching element S1 and, thus, charging and discharging of the inductor L1. That is, by controlling the switching of the switching element S1 the voltage conversion of the preferably rectified and filtered AC input voltage $V_{IN}$ to the output voltage provided at the output O1, O2 of the LED driver stage 10 for driving the LEDs 3 of the LED string 2 may be controlled.

In detail, in the conductive state of the switching element S1 a current $I_L$ flows through the inductor L1 charging the inductor L1. In the non-conductive state of the switching element S1, the inductor L1 is discharged and a current flows from the inductor L1 via the diode D1 to the capacitor C1, wherein the capacitor C1 is charged.

The elements for rectifying and preferably filtering the AC supply voltage in order to provide the input voltage $V_{IN}$ are not shown in FIG. 5 and, preferably, are not part of the LED light source 1.

The switching element S1, inductor L1, diode D1 and capacitor C1 of the LED driver stage 10 according to FIG.

5 form a buck-boost-converter. However, as already outlined above, the actively switched LED driver stage may also comprise any other actively switched DC-to-DC-converter, such as e.g. a buck converter.

The switching element S1 may be controlled by a controller of the LED light source 1 (not shown in FIG. 5) or an external controller, wherein the controller is preferably an ASIC, microcontroller or hybrid thereof.

The LED string 2 of the LED light source 1 according to FIG. 5 comprises three LEDs 3. The LED string 2 may also comprise a different number of LEDs. In case, the LED string 2 comprises at least two LEDs 3, the LEDs 3 are preferably connected to each other in series and/or in parallel.

A resistive ohmic element 4 is connected in series to the LED string 2. The resistive ohmic element 4 of the LED light source according to FIG. 5 is preferably as outlined above with respect to the resistive ohmic element 4 of a direct AC LED light source.

As a result of the resistive ohmic element 4, the differential resistance of the resulting LED string formed by the series connection of the LED string 2 and the ohmic resistive element 4 is increase. By increasing the differential resistance the sensitivity of the LED string 2 to fluctuations in the AC supply voltage $V_{AC}$ is decreased respectively reduced and, thus, the degree of flicker occurring in the light emitted from the LED string 2 as a result of fluctuations in the AC supply voltage $V_{AC}$ is also reduced.

The invention claimed is:

1. A direct AC LED light source (1) receiving a rectified AC power comprising:
   a series connection of at least two LED strings (2a, 2b), wherein each of the at least two LED strings (2a, 2b) corresponds to a single LED or comprises at least two LEDs (3), said at least two LED strings (2a,2b) including a first LED string (2a) and a second LED string (2b) connected in series;
   at least one ohmic resistive element (4) connected in series with the first LED string (2a);
      at least two capacitors (6a, 6b), wherein a first capacitor (6a) of the at least two capacitors (6a, 6b) is connected in parallel to the series connection of the at least one ohmic resistive element (4) and the first LED string (2a) and the second capacitor (6b) of the at least two capacitors (6a, 6b) is connected in parallel to the second LED string (2b) of the at least two LED strings (2a, 2b); and
   at least one switching element (5) connected in parallel to the series connection of the at least one ohmic resistive element (4) and the first LED string (2a),
wherein the at least one switching element (5) is operated by a controller and is configured in its conductive state to bypass the series connection of the at least one ohmic resistive element (4) and the first LED string (2a); and
   at least one decoupling element (7) connected between the at least one switching element (5) and the respective parallel connection of the first capacitor (6a) and the series connection of the at least one ohmic resistive element (4) and the first LED string (2a), such that in the conductive state of the at least one switching element (5) the first capacitor (6a) is not discharged via the at least one switching element (5) and is configured to provide electrical energy to the first LED string (2a).

2. The LED light source (1) according to claim 1, wherein the at least one ohmic resistive element (4) is an ohmic resistor.

3. The LED light source (1) according to claim 1, wherein the at least one ohmic resistive element (4) is a dynamic ohmic resistive element comprising one of a linear current regulator or a variable current regulator.

4. The LED light source (1) according to claim 3, wherein the dynamic ohmic resistive element is configured to decrease its ohmic resistive value as the voltage across the respective capacitor decreases and vice versa.

5. The LED light source (1) according to claim 1, wherein the at least one switching element (5) is configured to limit the voltage across the series connection of the first LED string (2a) and the at least one resistive element (4) to a predetermined voltage value.

6. The LED light source (1) according to claim 1, wherein the at least one ohmic resistive element (4) is configured to increase the differential resistance of the series connection of the first LED string (2a) and the at least one ohmic resistive element (4), such that a flicker of the first LED string (2a) caused by the supply voltage (9) during operation of the LED light source (1) is less than 8%.

7. The LED light source (1) according to claim 1, wherein the at least one ohmic resistive element (4) has an ohmic resistive value between 50 Ohm and 800 Ohm.

8. The LED light source (1) according to claim 1, wherein the ohmic resistive value of the at least one ohmic resistive element (4) is chosen dependent on the differential resistance of the respective LED string (2a), such that the higher the differential resistance of the LED string (2a) the lower the ohmic resistive value of the at least one ohmic resistive element (4).

9. The LED light source (1) according to claim 1, wherein the at least two LED strings (2a, 2b) comprise a different number of LEDs (3).

10. The LED light source (1) according to claim 9, wherein an ohmic resistive element (4) is connected in series to each of the at least two LED strings (2a, 2b), and
the ohmic resistive value of the ohmic resistive element (4) connected to one (2a) of the at least two LED strings (2a, 2b) differs from the ohmic resistive value of the ohmic resistive element (4) connected to the other one (2b) of the at least two LED strings (2a, 2b).

11. The LED light source (1) according to claim 1, wherein an ohmic resistive element (4) is connected in series to each LED string that comprises more than a predetermined number of LEDs (3).

12. The LED light source (1) according to claim 1, wherein each of the at least two LED strings (2a, 2b) is connected in parallel to a switching element (5), which switching element (5) is configured to bypass the respective LED string.

13. The LED light source (1) according to claim 1, wherein the LED light source (1) comprises at least two switching elements (5),
wherein a first switching element (5) of the at least two switching elements (5) is connected in parallel to the series connection of the at least one ohmic resistive element (4) and the first LED string (2a),
wherein the second switching element (5) of the at least two switching elements (5) is connected in parallel to the second LED string (2b), and
wherein each of the two switching elements (5) is configured to bypass in its conductive state the respective LED string of the at least two LED strings (2a, 2b).

14. The LED light source (1) according to claim 1,
wherein the LED light source (1) comprises at least two switching elements (5) and at least two ohmic resistive elements (4),
wherein one ohmic resistive element (4) is connected in series to each of the at least two LED strings (2a, 2b),
wherein one switching element (5) is connected in parallel to each of the series connections of one ohmic resistive element (4) and the respective LED string (2a, 2b),
wherein each of the at least two switching elements (5) is configured to bypass in its conductive state the respective series connection of one ohmic resistive element (4) and the respective LED string (2a, 2b).

15. The LED light source (1) according to claim 1,
wherein the at least two LED strings comprise a different number of LEDs (3), such that in the series connection of the at least two LED strings each LED string (2a) has twice as much LEDs as the previous LED string (2b).

16. The LED light source (1) according to claim 1,
wherein the LED light source comprises at least four LED strings (2a, 2b, 2c, 2d),
wherein the first LED string (2a) of the at least four LED strings (2a, 2b, 2c, 2d), being connected to the node (N1) of the series connection of LED strings (2a, 2b, 2c, 2d) for receiving the high potential of the supply voltage (9), comprises 8 LEDs (3);
wherein the second LED string (2b) of the at least four LED strings (2a, 2b, 2c, 2d), being arranged nearest to the first LED string (2a) in the series connection of LED strings (2a, 2b, 2c, 2d), comprises 4 LEDs (3);
wherein the third LED string (2c) of the at least four LED strings (2a, 2b, 2c, 2d), being arranged second nearest to the first LED string (2a) in the series connection of LED strings (2a, 2b, 2c, 2d), comprises 2 LEDs (3); and
wherein the fourth LED string (2d) of the at least four LED strings (2a, 2b, 2c, 2d), being arranged most far away from the first LED string (2a) in the series connection of LED strings (2a, 2b, 2c, 2d), corresponds to a single LED (3).

17. The LED light source (1) according to claim 16,
wherein the LED light source comprises two ohmic resistive elements (4),
wherein one ohmic resistive element (4) is connected in series to each of the first and second LED string (2a, 2b).

18. The LED lamp, comprising at least one LED light source (1) according to claim 1.

19. The LED light source (1) according to claim 1, wherein the at least one ohmic resistive element (4) is configured to increase the differential resistance of the series connection of the first LED string (2a) and the at least one ohmic resistive element (4), such that a flicker of the first LED string (2a) caused by the supply voltage (9) during operation of the LED light source (1) is less than 4%.

20. The LED light source (1) according to claim 1, wherein the decoupling element is a diode.

21. The LED light source (1) according to claim 1 wherein the at least one ohmic resistive element (4) has an ohmic resistive value between 100 Ohm and 300 Ohm.

* * * * *